Figure 1:
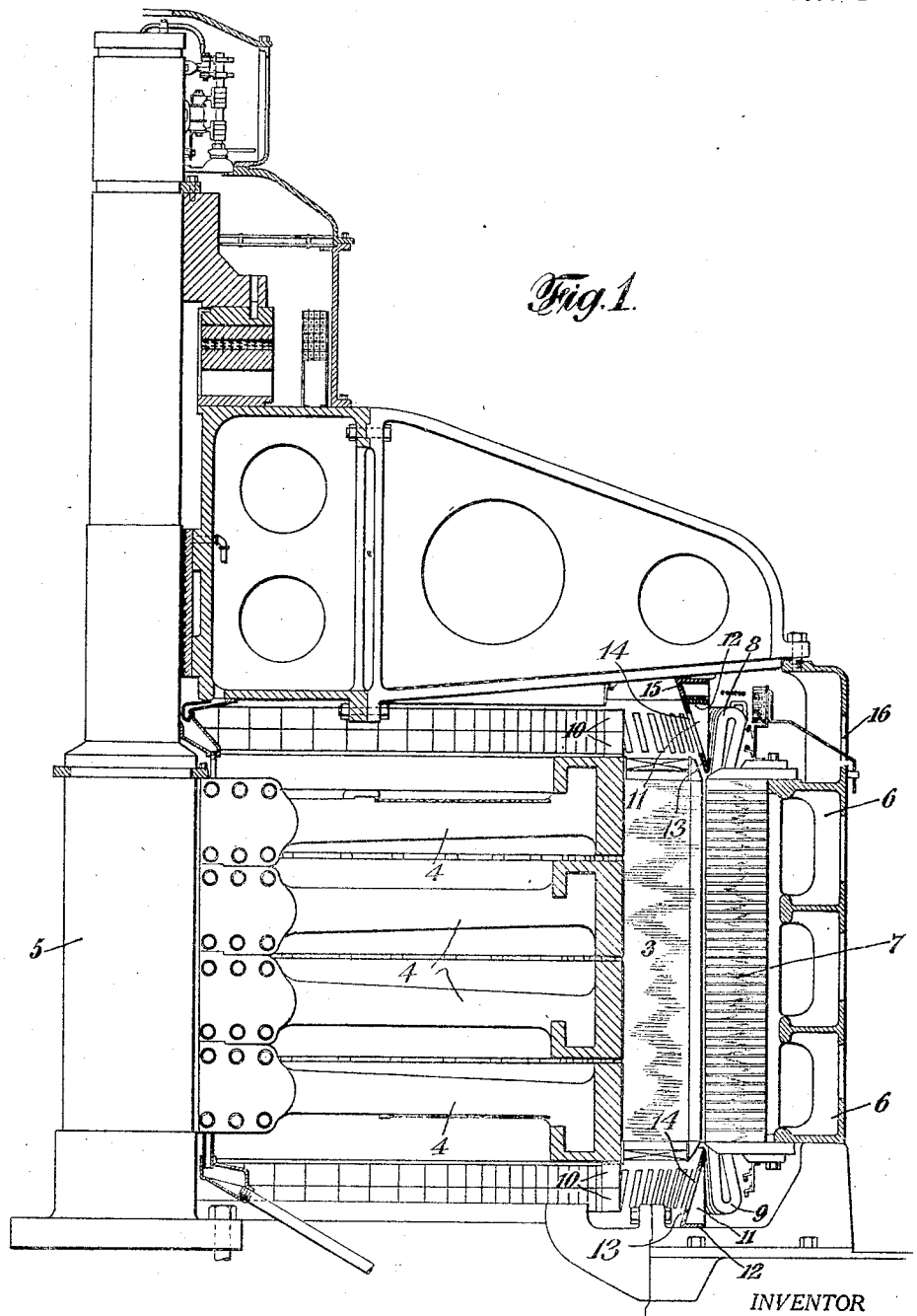

Jan. 26, 1926. 1,570,675
J. A. JOHNSON
DYNAMO ELECTRIC MACHINE
Filed March 9, 1923 3 Sheets-Sheet 1

INVENTOR
Joseph Allen Johnson
BY his ATTORNEYS
Ward, Crosby & Smith

Jan. 26, 1926. 1,570,675
J. A. JOHNSON
DYNAMO ELECTRIC MACHINE
Filed March 9, 1923 3 Sheets-Sheet 2

INVENTOR
Joseph Allen Johnson
BY his ATTORNEYS
Ward, Crosby & Smith

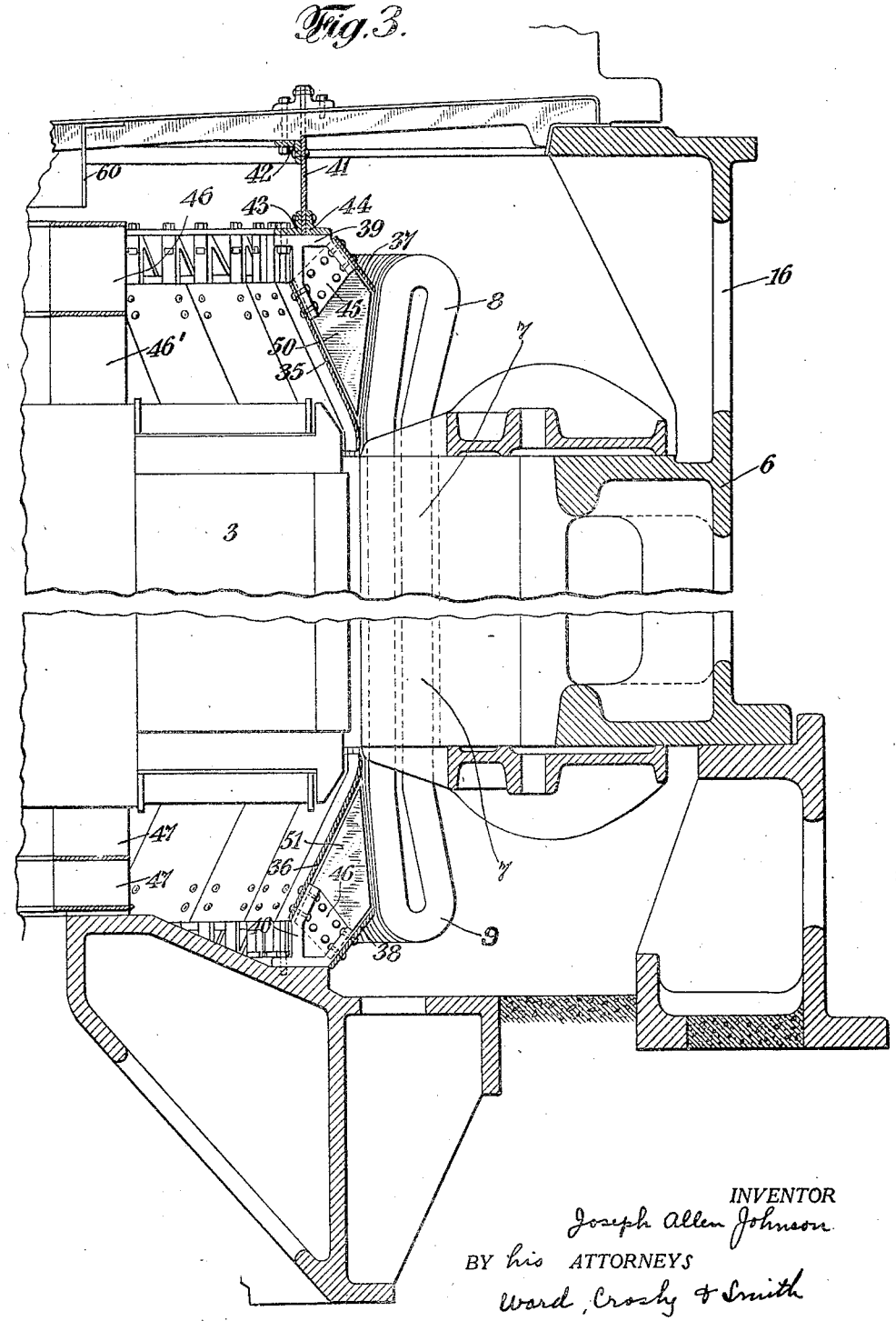

Patented Jan. 26, 1926.

1,570,675

UNITED STATES PATENT OFFICE.

JOSEPH ALLEN JOHNSON, OF NIAGARA FALLS, NEW YORK.

DYNAMO-ELECTRIC MACHINE.

Application filed March 9, 1923. Serial No. 623,833.

*To all whom it may concern:*

Be it known that I, JOSEPH ALLEN JOHNSON, a citizen of the United States, and resident of Niagara Falls, Niagara County, State of New York, have invented certain new and useful Improvements in Dynamo-Electric Machines, of which the following is a specification.

My invention relates to improvements in dynamo electric machines and more particularly to such machines having stator and rotor structures with the armature windings extending beyond the magnetic structure in which they are wound so as to form exposed portions of windings extending beyond said magnetic structure.

In machines of this character air is forced through suitable openings in the armature structure in order to keep the armature windings and structure relatively cool. This air is usually forced through these openings by the relative rotation of the field structure. Sometimes the field structure is provided with fan blades opposite said exposed portions of windings in order to more thoroughly ventilate the latter.

In such machines the armature windings occasionally become grounded or short-circuited in a manner to start a fire, burning the insulation on the windings, and the rapid rotation of the rotating structure causes the flames to be swept around with it and so greatly spreading the flames to other coils than those in which it started, and more particularly to the exposed portions of the windings extending beyond the magnetic structure.

In machines of large capacity such fires are very serious, the expense of rewinding and loss of use while so doing running into many thousands of dollars. So serious is the problem that in the past means have been provided to attempt to promptly put out such fires. According to one method the structures are so encased that the armature and field structures may be promptly shut off from the outside atmosphere and carbon dioxide gas introduced to fill the space about the windings to stop combustion. Another method is to provide a readily accessible water supply with which the windings may be drenched. In the latter case the damage done by the water is likely to be nearly as bad as that produced by the fire and the windings sometimes have to be wholly renewed even though only a small portion of them are burned. But in either case the rapid rotation of the rotating element so rapidly spreads the fire throughout the exposed portions of all the windings that renewal of all such windings is frequently required.

According to my invention I provide means between the exposed portions of windings and the structure rotating relatively thereto substantially preventing the latter from causing rotary motion of the air along or around the said exposed portions circumferentially of the machine and so prevent the sweeping action of the rotating part from spreading the fire from the exposed portion of one coil or set of windings to others.

Figure 2:
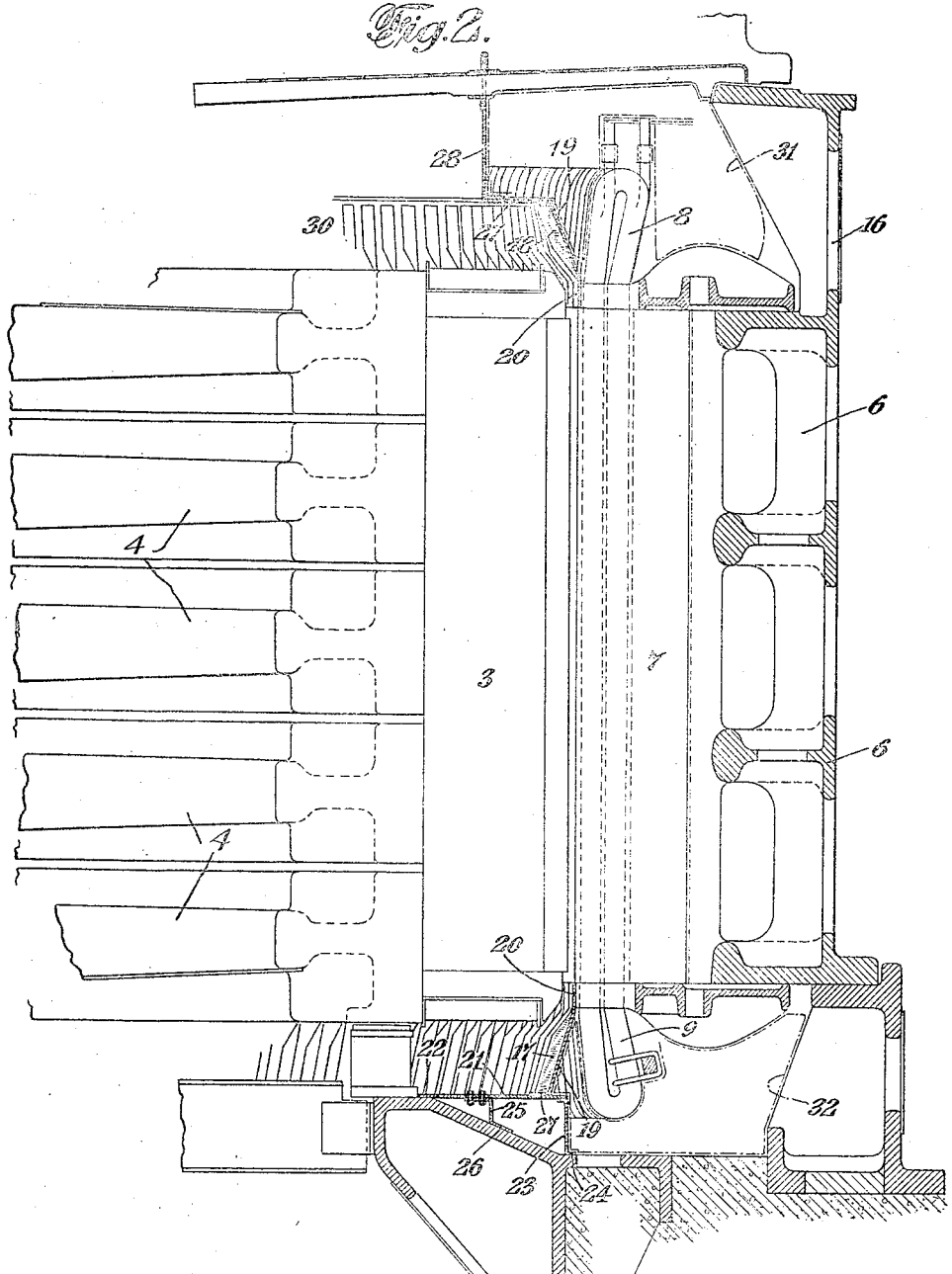

Further objects, features and advantages will more clearly appear from the detail description given below taken in connection with the accompanying drawings which form a part of this specification. In the drawings Fig. 1 is a vertical section of one-half of a dynamo electric machine embodying my improvements in one form. Fig. 2 is a similar section of a machine embodying my improvements in a modified form, and Fig. 3 illustrates in a similar manner a further modification.

Referring to Fig. 1 the particular machine there illustrated is a 12000 volt 65000 k. w. turbine driven alternating current generator provided with a suitable rotor field structure 3 supported by arms 4 and rotating at about 107 R. P. M. about a vertical axis at 5. The rotor structure is provided with suitable poles of magnetic material about which the field windings are suitably located. 6 represents a suitable framework encircling and supporting the stator armature structure 7 of magnetic material suitably apertured and in which the armature windings are located in any suitable or well known manner. These stator armature windings, however, have portions 8 at the top and 9 at the bottom which extend beyond, above and below the magnetic structure 7 so as to form exposed portions of the windings, i. e. portions which are not substantially embedded in the magnetic structure 7. The rotor field structure 3 is provided with suitable radially arranged apertures, through which, due to the rotation, air is forced outwardly by centrifugal force against the stator field structure and through suitable radially arranged apertures therein to keep the same and the windings therein cool. In some cases fan blades 10 are provided on the rotor for increasing the amount of air forced against and through the armature structure including the exposed portions 8 and 9. If, however, a fire occurs in any of the stator coils and particularly if it occurs in or reaches the exposed portions 8 and 9, the sweep of the rotor, (with or without blades 10) producing a rotary motion of air along and around said exposed portions circumferentially of the machine (i. e. circumferentially around the top and bottom of the magnetic structure of the stator where said exposed portions lie) causes fire to be swept from the exposed portion of one coil or winding to another until, before the machine can be stopped, all are afire. Whereupon the whole stator windings if not more must be renewed at very great expense.

To prevent this I place between the rotor and said exposed portions of the windings means preferably in the form of a slotted barrier or partition to substantially prevent the rotor from causing such rotary motion of the air surrounding the stator coil ends. As shown in Fig. 1 this consists of a series of plates 11, arranged radially with respect to the rotor axis. Said plates are provided with integral heel members 12 for securing the same in place with integral transverse members 13 extending circumferentially around the machine. The members 13 are placed close together so as to form a substantially continuous wall extending around the machine just inside of the exposed portions 8 and 9, and the members 13 are provided with apertures as at 14 to permit sufficient air to pass through to serve to keep the exposed portions 8 and 9 cool. The plates 11 are all rigid with the stator structure, the lower plates 11 being secured to the bed plate and the upper plates 11 being secured to the top frame work through an intermediate iron supporting member or members 15. While the rotor structure with or without the fans 10 will, by centrifugal action, force cooling air through the apertures 14 to cool the windings at 8 and 9, the radially arranged plates 11 nevertheless form a barrier to this air which causes the air to flow radially from these plates, through or past the exposed portions 8 and 9 and thence radially out through the openings 16 at the top and through similar suitable openings at the bottom, respectively, so that rotary motion of the air circumferentially of the machine and along or around the exposed portions of the windings at 8 and 9 is substantially prevented and if a fire occurs in any one winding or set of coils it will not be swept around to set fire to others before the machine can be stopped. The plates 11 may be made of any suitable material, such as non-magnetic alloys or molded insulating materials such as bakelized fabric. Any suitable means may be provided for closing all inlets of outside air to the rotor and stator structures and forcing in carbon dioxide gas to put out a fire in the windings, but as such means form no part of the present invention they are not shown, although my improvements may be used therewith to great advantage.

Referring to Fig. 2 the machine there illustrated is similar, except for minor differences which do not bear upon my improvements and except for the construction of the barrier. In this modified form the barrier consists of a plurality of plates or vanes 17 at the bottom and 18 at the top, which vanes are arranged radially with respect to the rotor axis, substantially like the plates 11 in Fig. 1 and operate in substantially the same manner. These vanes 17 and 18 however, are provided with lateral webs 19 which serve to strengthen the same, and with extensions 20 which are rigidly bolted or otherwise secured to the bottom and top of the stator armature magnetic structure respectively.

21 represents a series of plates of suitable insulating material such as asbestos or fiber, secured at their ends to the bed structure at 22 and secured to the supporting irons 23 at their outer ends which irons 23 are secured to the bed structure of the machine at 24.

It is also preferable to support the plates 21 intermediate their ends by supporting irons 25 secured to the bed structure at 26. The lower ends of the vanes 17 are secured to the insulating plates 21 at 27. It will be understood that the parts 21 to 26 inclusive form a supporting structure extending circumferentially around the machine and the vanes 17 form a circumferential slotted barrier or grating supported thereby. The vanes 17 are made of non-magnetic material and have their extended faces arranged radially with respect to the rotor axis as before, and they are spaced from one another so as to form openings therebetween through which air is forced by the rotor to cool the windings at 8 and 9. Said vanes 17 are also insulated from one another at one point, i. e. at their lower ends where they are secured to the asbestos or other insulating plates 21 so that no complete electric circuit is formed around the openings through two of the vanes.

The arrangement at the top is similar, the upper ends of the vanes 18 being secured to horizontal plates of insulating material which in turn are secured to iron or steel plates 28 by angle irons and which plates 28 are secured to and suspended from the top framework of the machine. The plates 27 and 28 together with the vanes 18, 19, form a slotted wall extending circumferentially about the upper end of the rotor, which wall, together with the framework of the machine forms a chamber containing the exposed portions 8, which chamber is closed to the outside of the machine except for the doors at 16 and is also closed to the inside of the machine or rotor chamber 30 except for the openings or passages between the vanes 18. Similarly the portions 9 at the bottom are enclosed in a chamber closed to the inside of the machine or rotor chamber by the circumferential wall formed of plates 21 and vanes 17 except for the passages or apertures between the vanes 17. Thus the spaces in which the winding portions 8 and 9 are located are practically walled off by these barriers from the rotor chamber and yet spaces are left between the vanes 17 and 18 respectively sufficient to permit the rotor to force air through to cool the exposed portions of the armature coils, but the radially arranged faces of the vanes 17 and 18 force this air to take a radial path so that it is not swept around circumferentially of the machine to cause a fire in one or more coils to be swept around circumferentially of the machine and set fire to others. If desired the chambers in which the exposed portions 8 and 9 are located may be subdivided radially by asbestos or other suitable plates 31 and 32 respectively (shown in dotted lines). These plates may be secured vertically in these chambers in any suitable manner and serve further to prevent any rotary motion of the air in the chambers circumferentially of the machine. The plates 31 and 32 are cut and shaped to conform to the cross section of the chambers and they are cut away to provide suitable openings for the ends of the coils and leads therefrom. It is believed however, that in most cases these plates 31 and 32 will not be necessary as the vanes 17 and 18 will serve to confine the air passing by the exposed ends of the windings, substantially to a radial direction.

With regard to the vanes 17 and 18, they do not have to be perfectly flat or exactly radial. They may have various shapes, depending upon conditions. In fact, the most efficient form of these vanes and the proper shape for each case may probably be calculated from the known conditions with a fair degree of accuracy.

In the form shown in Fig. 3 the means for preventing the rotor from causing rotary motion of air along or around the exposed portions 8 of the stator windings circumferentially of the machine, consists of a solid inclined wall 35 extending circumferentially at the top of the machine and a similar wall 36 at the bottom, these walls having their outer edges substantially at the bases respectively of said exposed portions of the windings. These walls are preferably made of canvas impregnated and stiffened with bakelite. There is also a second similar wall 37 extending circumferentially of the machine at the top and a similar wall 38 at the bottom, these walls having their outer edges substantially at the outer ends of said exposed portions of windings. The walls 35 and 37 and 36 and 38 are built of separate plates, held in position by being bolted to suitable castings 39 and 40 respectively at the top and bottom of the machine. The castings 39 and 40 are arranged circumferentially of the machine, the lower castings 40 being bolted to the bed plate and the upper castings 39 being supported by the circular iron or steel wall 41 which is secured to the upper part of the frame of the machine by angles 42 and to the castings 39 by angles 43 and 44 which serve also to stiffen the whole structure. The castings 39 and 40 are provided with integral webs 45 and 46 respectively which form vanes radially arranged with respect to the axis of the rotor 3. There are provided on the rotor, fan blades 46' and 47 which force air outwardly through the openings between the vanes 45, 45, and 46, 46, respectively whence the air is directed downwardly by the walls 35 and 37 directly on to the exposed coil ends 8 at the top of the machine and at the bottom the air is directed upwardly between the walls 36 and 38 directly onto the exposed coil ends 9 at the bottom of the machine, so that the coil ends are effectively cooled. To more effectively create sufficient pressure and air current at the top, I provide a cylindrical wall 60 at the top just over the fan blades 46. It will be noted that the spaces at the top and bottom of the stator windings are entirely closed off from the rotor chamber by the wall structures just described except for the spaces between the vanes 45, 45, and 46, 46, respectively which vanes force the air outwardly in a radial direction and with the rest of the barrier wall structures preventing the rotor from causing rotary motion of air along or around the exposed portions of the stator windings circumferentially of the machine. If the vanes 45 and 46 are not quite sufficient for this purpose they may in effect be made larger by attaching thereto extension vanes 50 and 51 respectively.

Instead of using the fan blades 46' and 47 the cooling draft for the exposed stator windings may be obtained by means of external blowers which will create a negative pressure or suction in the chambers at or around the projecting windings 8 and 9, thereby bringing the air through the openings by suction.

In the arrangement shown in Fig. 3 the chambers at the top and bottom of the stator in which the exposed coil ends 8 and 9 are located, may be substantially closed to the outside atmosphere by closing off the openings 16 and so the arrangement lends itself particularly well to the use of carbon dioxide or other gases for the extinguishing of fire. If the chambers are closed and flooded with such a gas, its escape must take place back through the openings between the vanes 45 and 46, and in so doing it must pass through and around the projecting end windings where the fire is, thereby most effectively acting to smother the fire.

In each of the arrangements shown the circumferentially arranged protecting barrier comprising the vanes and cooperating wall structures, is made up in sections. That is, the barrier is formed of a plurality of circumferentially arranged sections which are independently removable so that one or more sections of the entire barrier may be removed as a unit or units by the removal of a few bolts and without dismantling the machine as a whole.

In each of the arrangements shown, means are provided which serve as a deflecting barrier or partition between the rotor and exposed portions of the stator windings substantially preventing the rotor from causing rotary motion of the air along or around the exposed portions of the stator windings circumferentially of the machine. With any of these arrangements suitable means may be provided for introducing carbon dioxide or other inert gas around the windings to put out a fire if and when the same occurs.

The improvements may be applied to many different types of dynamo electric machines and those shown in the drawings are given as examples merely. Likewise the barrier may be greatly modified and may assume many different forms without departing from the spirit and scope of the invention in its broader aspects. Hence I desire to cover all forms coming within the language or scope of any one or more of the appended claims.

What I claim as new and desire to secure by Letters Patent, is:

1. In a dynamo electric machine having suitable stator and rotor windings with wound portions of the stator windings exposed from and extending beyond the magnetic structure in which they are wound and in which stator parts are cooled by circulation of air produced by the rotor, the improvement which consists in means between the rotor and exposed portions of the stator windings substantially preventing the rotor from causing motion of air along or around the exposed portions of the stator windings circumferentially of the machine.

2. In a dynamo electric machine having a rotor field rotating about a vertical axis and a stator armature structure with the armature windings extending beyond the magnetic structure of the armature in which they are wound so as to form exposed portions of armature windings above and below the magnetic structure of the armature in which the armature windings are wound and in which stator parts are cooled by circulation of air produced by the rotor, the improvement which consists in means at the top and bottom between the rotor and exposed portions of the stator windings substantially preventing the rotor from causing rotary motion of air along or around the exposed portions of the stator windings circumferentially of the machine.

3. In a dynamo electric machine having rotor and stator structures with their respective windings and the armature windings extending beyond the magnetic structure in which they are wound so as to form exposed portions of armature windings extending beyond said magnetic structure, and in which stator parts are cooled by circulation of air produced by the rotor, the improvement which consists in means forming a barrier between the said exposed portions of windings and the structure rotating relatively thereto substantially preventing the latter from causing rotary motion of air along or around said exposed portions circumferentially of the machine.

4. In a dynamo electric machine having rotor and stator structures with their respective windings and the armature windings extending beyond the magnetic structure in which they are wound so as to form exposed portions of armature windings extending beyond said magnetic structure and in which stator parts are cooled by circulation of air produced by the rotor, the improvement which consists in a barrier between the said exposed portions of windings and the structure rotating relatively thereto substantially preventing the latter from causing rotary motion of air along or around said exposed portions circumferentially of the machine, said barrier being fixed with respect to said armature windings and having apertures to permit air circulated by the rotor to reach said exposed portions of windings.

5. In a dynamo electric machine having rotor and stator structures with their respective windings and the armature windings extending beyond the magnetic structure in which they are wound so as to form exposed portions of armature windings extending beyond said magnetic structure, the improvement which consists in means between the said exposed portions of windings and the structure rotating relatively thereto substantially preventing the latter from causing rotary motion of air along or around said exposed portions circumferentially of the machine, said means being fixed with respect to said armature windings, and comprising a plurality of vanes arranged with their extended faces substantially radial with respect to the axis of the structure rotating with respect to the armature windings.

6. In a dynamo electric machine of large capacity having a rotor field rotating about a vertical axis and a stator armature structure with the armature windings extending beyond the magnetic structure of the armature in which they are wound so as to form exposed portions of armature windings above and below the magnetic structure of the armature in which the armature windings are wound, the improvement which consists in means at the top and bottom, between the rotor and exposed portions of the stator windings substantially preventing the rotor from causing rotary motion of air along or around the exposed portions of the stator windings circumferentially of the machine, said means being fixed with respect to the stator and comprising a plurality of vane members of non-conducting non-magnetic material arranged with their extended faces substantially radial with respect to the axis of the rotor.

7. In a dynamo electric machine having rotor and stator structures with field windings on the rotor and armature windings on the stator extending beyond the magnetic structure in which they are wound so as to form exposed portions of armature windings extending beyond said magnetic structure, the improvement which consists in apertured barrier forming means between the said exposed portions of windings and the rotor substantially preventing the latter from causing rotary motion of air along or around said exposed portions circumferentially of the machine, said barrier means being fixed with respect to the stator and being formed of non-magnetic material.

8. In a dynamo electric machine having rotor and stator structures with field windings on the rotor and armature windings on the stator extending beyond the magnetic structure in which they are wound so as to form exposed portions of armature windings extending beyond said magnetic structure, the improvement which consists in means between the said exposed portions of windings and the rotor substantially preventing the latter from causing rotary motion of air along or around said exposed portions circumferentially of the machine, said means being fixed with respect to the stator and being formed of non-magnetic material and comprising a plurality of plates with openings therebetween and with the extended faces of the plates arranged substantially radially with respect to the rotor axis.

9. In a dynamo electric machine having rotor and stator structures with field windings on the rotor and armature windings on the stator extending beyond the magnetic structure in which they are wound so as to form exposed portions of armature windings extending beyond said magnetic structure, the improvement which consists in means between the said exposed portions of windings and the rotor substantially preventing the latter from causing rotary motion of air along or around said exposed portions circumferentially of the machine, said means being fixed with respect to the stator and being formed of non-magnetic material and comprising a plurality of vanes with openings therebetween and said vanes being insulated from one another at one end so no complete electric circuit is formed around the opening respectively through two of the plates.

10. In a dynamo electric machine having rotor and stator structures with the armature windings extending beyond the magnetic structure in which they are wound, so as to form exposed portions of the armature windings extending beyond said magnetic structure, the improvement which consists in a slotted partition extending circumferentially of the machine between said exposed portions of windings and the structure rotating relatively thereto, said partition substantially preventing the latter from causing rotary motion of air along or around said exposed portions of the windings circumferentially of the machine but said partition being adapted to permit cooling air to pass through the slots thereof to cool said exposed portions of windings.

11. In a dynamo electric machine having rotor and stator structures with the armature windings extending beyond the magnetic structure in which they are wound, so as to form exposed portions of the armature windings extending beyond said magnetic structure, the improvement which consists in a partition extending circumferentially of the machine between said exposed portions of windings and the structure rotating relatively thereto, said partition being fixed with respect to said exposed portions of windings and having openings therein directing the air currents produced by the relative rotation between and across said exposed portions.

12. In a dynamo electric machine having rotor and stator structures with the armature windings extending beyond the magnetic structure in which they are wound, so as to form exposed portions of the armature windings extending beyond said magnetic structure, the improvement which consists in a partition extending circumferentially of the machine between said exposed portions of windings and the structure rotating relatively thereto, said partition having two walls extending circumferentially of the machine with vanes extending therebetween at spaced intervals, said walls and vanes being shaped and positioned to cause air forced through the spaces between them to be directed upon said exposed portions of windings.

13. In a dynamo electric machine having rotor and stator structures with the armature windings extending beyond the magnetic structure in which they are wound, so as to form exposed portions of the armature windings extending beyond said magnetic structure, the improvement which consists in a partition extending circumferentially of the machine between said exposed portions of windings and the structure rotating relatively thereto, said partition having two inclined walls extending circumferentially of the machine with radially arranged vanes extending therebetween at spaced intervals, said walls being inclined in a direction to cause air forced through the spaces between them to be directed upon said exposed portions of windings, and said walls being formed of non-conducting non-magnetic material.

14. In a dynamo electric machine having rotor and stator structures with the armature windings extending beyond the magnetic structure in which they are wound, so as to form exposed portions of the armature windings extending beyond said magnetic structure, the improvement which consists in a partition extending circumferentially of the machine between said exposed portions of windings and the structure rotating relatively thereto, said partition having two walls extending circumferentially of the machine with vanes extending therebetween at spaced intervals, said walls and vanes being shaped and positioned as to cause air forced through the spaces between them to be directed upon said exposed portions of windings, the inner wall having its outer edge substantially at the base of said exposed portions of windings and the outer wall having its outer edge substantially at the outer ends of said exposed portions of windings.

15. In a dynamo electric machine having rotor and stator structures with their respective windings and the armature windings extending beyond the magnetic structure in which they are wound so as to form exposed portions of armature windings extending beyond said magnetic structure and in which stator parts are cooled by circulation of air produced by the rotor, the improvement which consists in means between the said exposed portions of windings and the structure rotating relatively thereto substantially preventing the latter from causing rotary motion of air along or around said exposed portions circumferentially of the machine, said means being fixed with respect to said armature windings, said means comprising a circumferentially arranged barrier formed of a plurality of circumferentially arranged sections.

16. In a dynamo electric machine having suitable stator and rotor windings with wound portions of the stator windings exposed from and extending beyond the magnetic structure in which they are wound, the improvement which consists in means between the rotor and exposed portions of the stator windings substantially preventing the rotor from causing motion of air along or around the exposed portions of the stator windings circumferentially of the machine, said means comprising a circumferentially arranged apertured barrier formed of a plurality of circumferentially arranged sections which are independently removable.

17. In a dynamo electric machine having rotor and stator structures with the armature windings extending beyond the magnetic structure in which they are wound, so as to form exposed portions of the armature windings extending beyond said magnetic structure and in which stator parts are cooled by circulation of air produced by the rotor, the improvement which consists in a partition extending circumferentially of the machine between said exposed portions of windings and the structure rotating relatively thereto, said partition having openings therein directing the air currents produced by the relative rotation between and across said exposed portions, but substantially preventing the relative rotation from causing rotary motion of air along or around said exposed portions of windings circumferentially of the machine, and said partition comprising a plurality of circumferentially arranged sections fixed with respect to, but independently removable from the stator structure.

In testimony whereof I have signed my name to this specification.

JOSEPH ALLEN JOHNSON.